United States Patent [19]

Brown

[11] Patent Number: 4,553,575
[45] Date of Patent: Nov. 19, 1985

[54] DOWEL CUTTER AND SIZER

[76] Inventor: Kenneth L. Brown, 15913 Amherst, Birmingham, Mich. 48009

[21] Appl. No.: 561,213

[22] Filed: Dec. 13, 1983

[51] Int. Cl.[4] ............................................. B27C 9/00
[52] U.S. Cl. ........................................ 144/12; 142/1; 142/32; 142/54; 144/4; 144/134 R
[58] Field of Search ............... 144/2 R, 4, 12, 205, 144/198 R, 134 R; 142/1, 31, 25, 28, 32, 45, 46, 48; 279/4

[56] References Cited

U.S. PATENT DOCUMENTS

| | | |
|---|---|---|
| Re. 4,109 | 8/1870 | Boynton . |
| 8,990 | 6/1852 | Tayman ............................ 142/32 |
| 18,680 | 11/1857 | Cooke . |
| 435,463 | 9/1890 | Stewart . |
| 569,234 | 10/1896 | Rockwell . |
| 654,260 | 7/1900 | Johnson . |
| 722,486 | 3/1903 | Bullock ............................ 142/25 |
| 773,929 | 11/1904 | Danhof . |
| 1,624,274 | 4/1927 | Myrdal . |
| 1,676,738 | 7/1928 | Lotterman et al. . |
| 2,279,730 | 4/1942 | Bradley ............................ 279/4 |
| 2,612,193 | 9/1952 | Springer ............................ 144/12 |
| 2,645,253 | 7/1953 | Wilson ............................ 142/54 |
| 2,755,827 | 7/1956 | Gerging ............................ 143/85 |
| 2,865,413 | 12/1958 | Smith ............................ 144/136 |
| 3,068,916 | 12/1962 | Richardson ............................ 144/12 |
| 3,207,191 | 9/1965 | Ervin ............................ 143/85 |
| 3,234,974 | 2/1966 | Ray ............................ 142/32 |
| 3,522,826 | 8/1970 | Ervin ............................ 144/4 |
| 3,651,843 | 3/1972 | MacQueston ............................ 144/198 R |
| 3,951,187 | 4/1976 | Chisum ............................ 144/1 R |
| 4,061,165 | 12/1977 | Harwood et al. ............................ 142/1 |
| 4,407,342 | 10/1983 | Deaner ............................ 144/12 |
| 4,460,532 | 7/1984 | Cornell ............................ 144/12 |

Primary Examiner—W. D. Bray
Attorney, Agent, or Firm—Harness, Dickey & Pierce

[57] ABSTRACT

A dowel cutting method and apparatus comprising a stationary cutting tool having an internal bore and at least one cutting edge at its input end into which woodstock is disposed while being rotated by an electric hand drill or the like to create a finished dowel at the opposite end of the cutting tool. The cutting tool may be held in a bench vise. A sizer for dowels is also disclosed comprising a series of holes in a flat metal plate having a ground side which cuts down a dowel in a sequence of operations, if needed, to an accurate smaller dowel. A simple final sanding operation is also disclosed utilizing sandpaper and the sizing apparatus.

14 Claims, 10 Drawing Figures

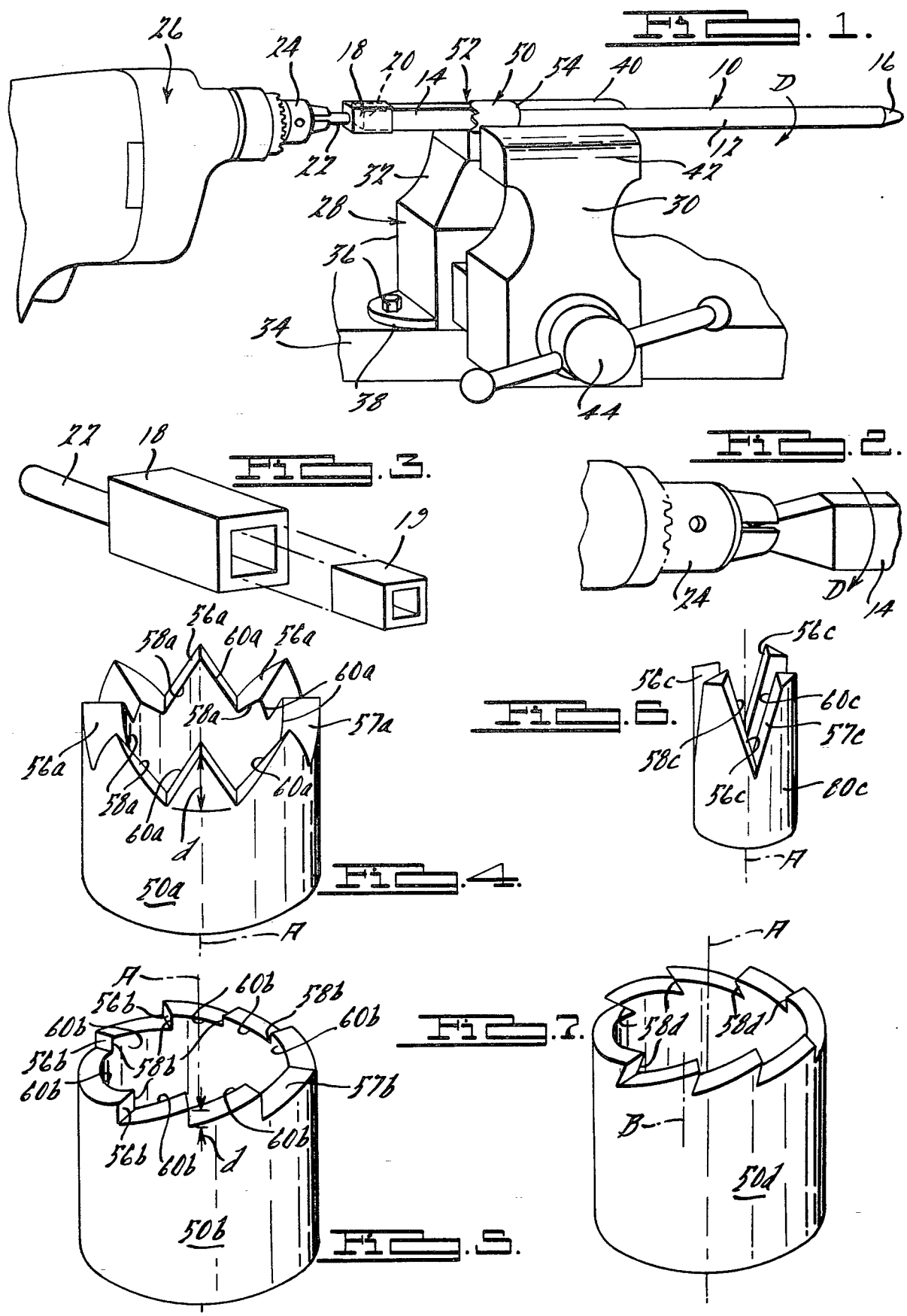

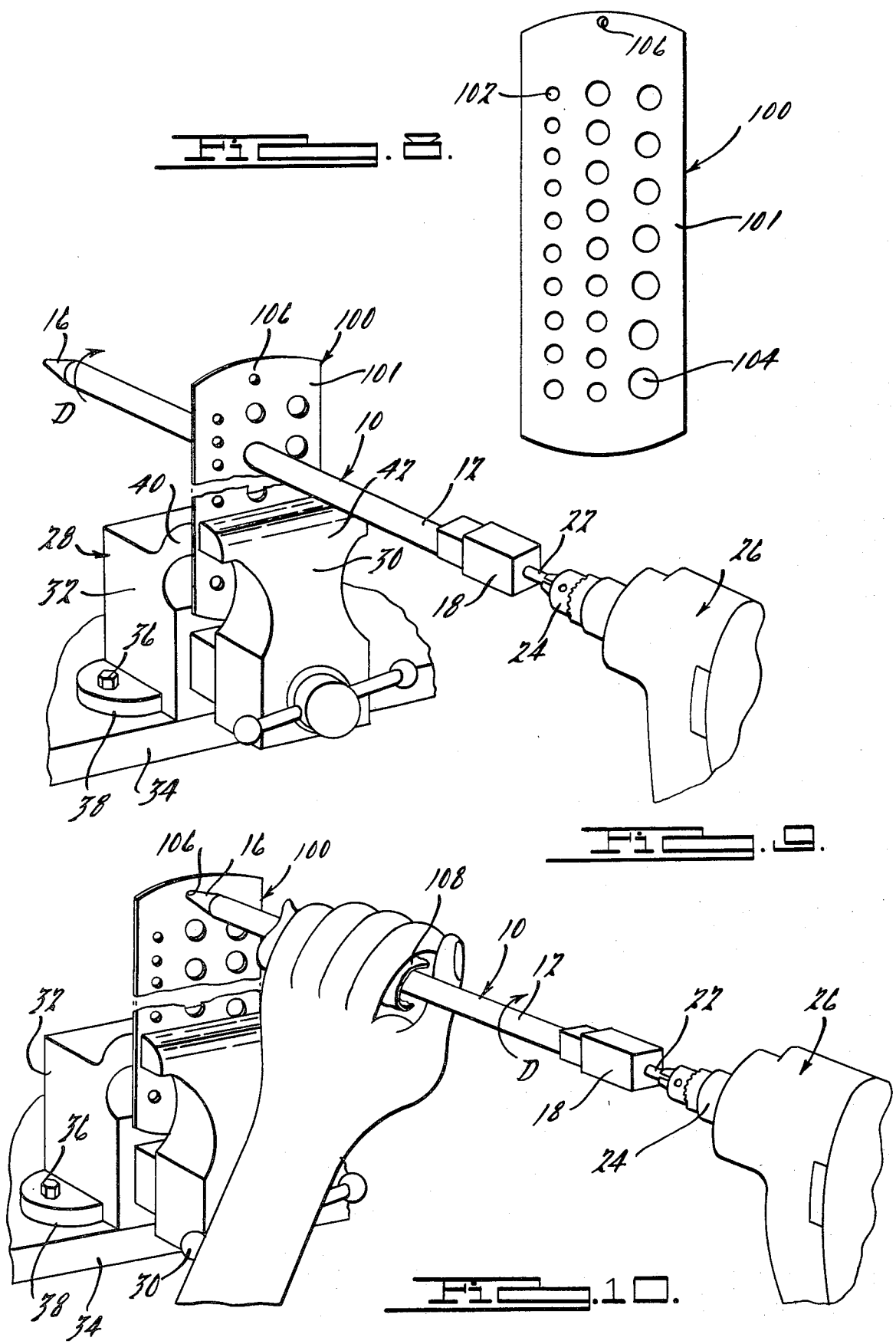

4,553,575

DOWEL CUTTER AND SIZER

BACKGROUND AND SUMMARY OF THE INVENTION

The present invention relates to wood cutting tools and in particular to a dowel cutter and sizer.

In carpentry, cabinet making, model making, and other wood working, a need exists for making dowels easily and cheaply out of the same wood with which the wood worker is using. In the prior art, cumbersome machines, such as a lathe, or a large specially manufactured jig, such as that disclosed in U.S. Pat. No. 1,624,274, are needed in order to manufacture a dowel.

The present invention makes dowel cutting out of the same piece of wood possible with only a vise to hold the cutter of the present invention and an electric hand drill to turn the woodstock. The finished dowel is simple to make and has a refined surface that requires little or no sanding subsequent to manufacture.

The inside diameter of the cutter determines the size of the dowel. The cutters of the present invention are principally intended to be used to manufacture dowels from 1/32 of an inch to 3/4 of an inch in diameter. The cutters themselves are also simple and very inexpensive to make. The cutters are manufactured from cold rolled steel and not hardened in any manner. The lack of hardening permits the carpenter to sharpen them as required, although as an option the cutters can be hardened and ground if the need or desire arises.

Other advantages of the present invention in addition to its ease of operation and quality of finished product, is the additional capability of the present invention to size a particular piece of stock to any dimension desired. If sanding is required, the dowel may also be readily sanded by utilizing the same components used to cut and size the stock.

Other advantages of the present invention will be readily understood from the following specification, claims, and drawings.

BRIEF DESCRIPTION OF THE DRAWINGS

FIG. 1 is an elevated perspective view of the present invention as utilized with a bench vise and a hand drill;

FIG. 2 is an exploded elevated side view of an alternative means of holding the woodstock in the method and apparatus of the present invention;

FIG. 3 is an elevated perspective side view of an alternative embodiment of the chuck of FIG. 1;

FIG. 4 is an elevated perspective side view of one embodiment of the cutting tool of the present invention;

FIG. 5 is an elevated perspective side view of an alternative cutting tool embodiment having a lower cutting edge angle;

FIG. 6 is an elevated perspective side view of another alternative cutting tool embodiment to the cutting tool of FIG. 4 having a higher cutting edge angle;

FIG. 7 is an elevated perspective side view of a cutting tool having a cutting edge angle similar to FIG. 5 and including a back angle in the cutting portion of the tool;

FIG. 8 is an elevated front view of a sizing cutter of the present invention;

FIG. 9 is an elevated perspective of a sizing cutter in operation sizing a dowel on a bench vise; and FIG. 10 is a view similar to FIG. 9 of a sanding operation to refine the finish of a dowel which is utilizable with the apparatus and within the method of the present invention.

DETAILED DESCRIPTION OF THE PREFERRED EMBODIMENT

Referring to FIG. 1, a partially finished dowel 10 is illustrated in the process of the present invention utilizing the apparatus of the present invention. The dowel 10 as illustrated has a finished portion 12 and a stock portion 14 from which the finished portion 12 is cut. The stock portion 14 has a square cross section approximately 1/32 of an inch larger than the diameter of dowel size desired. The stock 14 may be cut from a block of wood similar to or the same as the wood that was used for other portions of the final product desired, such as a chair, shelf, stairway rail, or other wood construction in which the dowel 12 will be used. After the stock 14 has been cut to an appropriate size, a taper 16 and 20 is formed at both ends of the stock 14, by sawing, sanding, whittling, or whatever similar operation may be selected by the user.

In FIG. 1, a woodstock holder 18 is placed over one end 20 of the stock 14. The end 20 is tapered as necessary to fit snugly into the holder 18. The holder 18 includes a post 22 which is insertable into the conventional rotatably adjustable chuck 24 of a conventional hand drill 26 capable of powered rotation of the drill 24 and thereby the stock 14 inserted in the holder 18 in the direction illustrated by the curved arrow D in FIG. 1. As shown in FIG. 2, the end 20 of the stock 14 to be associated with the drill 26 may also be tapered and inserted directly into the drill chuck 24. The primary considerations for direct insertion of the woodstock 14 in the drill 26 is that the woodstock 14 be tapered to a thickness smaller than the diameter of the clamping portion of the drill chuck 24 and be a type of wood having a sufficient hardness to withstand the various forces to be presented in rotation by the drill chuck 24. Wood having a hardness greater than or equal to oak has been used satisfactorily by placement of the wood directly into the drill chuck 24 for manufacture of a dowel.

The use of the holder 18, however, is the preferred apparatus and method due to its satisfactory performance with a wider variety of types of wood, and other advantages apparent from the above description. As shown in FIG. 3, the holder 18 may be made even more versatile with the use of an insert 19 useable with much thinner cross-sections of woodstock. An insert 19 may be provided to correspond to various inside cutting diameters of cutting tools to be associated with the inserts, but use of one holder and one insert along with tapering the woodstock to fit the holder or holder with insert has been deemed satisfactory to make dowels over the entire range up to 3/4 inch diameter dowels.

A conventional vise 28 having a screw-operated movable jaw 30 and a stationary jaw 32 is mounted to a bench 34 by bolts 36 through bores in the flanges 38 on opposite sides of the stationary jaw 32 (one shown, one not shown). The stationary jaw 32 has a holding head 40 and the movable jaw 30 has a holding head 42 which are movable towards one another by a screw mechanism 44 to be capable of holding a cutting tool 50 between the heads 42, 44 in a stationary position.

The input end 52 of the cutting tool 50 has a series of cutting edges thereon which cut the stock to create and finish the portion of the dowel as illustrated by the numeral 12 in FIG. 1 presented at the output portion 54 of the tool 50. Each cutting tool 50 has an axial length (along the axis A—A) sufficient to stabilize the woodstock through the cutting operation of the tool and a wall thickness sufficient to provide stable cutting edges. It has been found that an axial length of approximately ½ inch for a 7/32 or 5/16 inch inside cutting diameter has been satisfactory with a wall thickness of ⅛ inch. For a 7/16 or 13/32 inch inside cutting diameter, an axial length of ⅝ inch and a wall thickness of ⅛ inch is preferred. For a ⅜ or ½ inch inside cutting diameter, an axial length of ¾ inch and a wall thickness of 5/32 inch was preferred.

The cutting tool 50 has a variety or range of alternative forms as illustrated by some examples in FIGS. 4 through 7. FIG. 4 illustrates a cutting tool 50a having a cutting angle of approximately 60 degrees for each of its cutting blades with the axis of rotation of the stock as it passes through the tool. The faces 56a and 57a of the cutting tool 50a are substantially perpendicular to the surface of the finished dowel 12 as it passes through the cutting tool, with the cutting edges 58a and 60a being substantially identical, although at mirror-image angles of on another, along the surface of the finished stock 14. The cutting tool 50a of FIG. 4 demonstrates a readily manufactured tool having an even number of cutting edges. If an even number of cutting edges are desired in the final cutting tool, the cutting tool 50a can be manufactured by cross-cutting the input end 52 of the tool 50a with only one cut necessary for each pair of cutting edges. The depth "d" of the tool cutting edges 58a does not need to be particularly accurately controlled. Thus, the manufacture of the cutting tool of the present invention lends itself to inexpensive manufacturing techniques while still providing a highly satisfactory tool 50a capable of creating high quality finished dowels in the method of and with the apparatus of the present invention.

FIG. 5 illustrates a cutting tool 50b which demonstrates that the angles of the cutting edges may be a very low angle (plus 3 to 5 degrees) with the axis of rotation of the dowel, having a minimal depth "d", with nonuniformity between the cutting edges 58b and 60b. The faces 56b each form a similar low angle with the axis of rotation of the tool A—A. In FIG. 6, a satisfactory tool 50c has cutting edges 58c which form an angle of approximately plus 80 degrees with the axis of rotation A—A and has symmetrical and uniform faces 56c and 57c. In FIG. 7, a tool similar to tool 50b is shown by tool 50d, except that the cutting edges 58d form a back angle of minus 30 degrees in the opposite direction of the other cutting edges 58a, 58b, and 58c with a line B—B parallel with the axis of rotation A—A.

Thus, except for the zero angle and a small range of 1 or 2 degrees on each side of the zero angle, an entire range of cutting edge angles may be used in either the plus or minus direction. Most satisfactory performance, however, has been found with the preferred embodiment of plus 60 degrees cutting edges.

Thus, it is a simple procedure for an operator to cut the square cross section dowel stock 14 to a suitable size, take a tool 50 of a selected inside diameter and place it securely into the vise 28, place the stock within the holder 18 associated with the hand drill 26 or, alternatively, directly into the chuck 24 of the hand drill 26 as shown in FIG. 2, make a pointed end 16 on the other end of the dowel stock 14, and simply run the stock 14 through the cutting tool 50. This simple procedure yields a dowel of refined finish for the operator which he can cut to length as desired for whatever operation or construction the finished dowel is used.

Referring to FIGS. 8 through 10, if the carpenter or woodworker needs an accurate diameter dowel of a diameter other than the diameter of the cutting tool that he has, a sizing operation can be performed once the dowel has been suitably created. The dowel sizer 100 as illustrated in FIG. 8 is a metal plate having a multiplicity of sized holes which are gauged from small to larger diameters at whatever variance between diameters is desired. In a preferred embodiment, the sizing holes are measured on the English unit scale and range from sizing hole 102 having a diameter of 1/16 (0.062) inch to sizing hole 104 having a diameter of ½ (0.500) inch. The sizer 100 disclosed here is meant to be used with a cutter of ½ inch inside cutting diameter or less. The intermediate holes have diameters of 5/64, 3/32, 7/64, ⅛, 9/64, 5/32, 11/64, 3/16, 13/64, 7/32, 15/64, ¼, 17/64, 9/32, 19/64, 5/16, 21/64, 11/32, 23/64, ⅜, 25/64, 13/32, 27/64, 7/16, 29/64, 15/32, and 31/64. The sizer 100 may also be set up according to drill sizes, such as a sizer 100 ranging from a diameter of 0.234 inches to 0.413 inches with intermediate holes having diameters of 0.238, 0.242, 0.246, 0.250, 0.257, 0.261, 0.266, 0.272, 0.276, 0.281, 0.290, 0.295, 0.302, 0.316, 0.323, 0.332, 0.339, 0.348, 0.358, 0.368, 0.377, 0.386, 0.397, and 0.404.

The sizer 100 is a metal plate having all of the above diameter holes and having at least one side face 101 of the metal plate 100 ground to provide a finished sharp edge at the entrance to each hole location provided by initially grinding the face 101 with a surface grinder. All of the holes of the sizer 100 may then be re-sharpened after use by merely filing the face 101 with a flat mill file.

In operation, as illustrated in FIG. 9, the sizer 100 is placed within the jaws of the vise 28 and held in place on the bench 34. The dowel is then taken step-by-step down in size by repeated operations through the sizer until the accurately sized dowel is at the diameter desired. In the use of the sizer 100, a more accurate and more stable direction of feed (approximately ninety degrees to the plane formed by the sizer 100) is needed for a high quality dowel than in the use of the cutting tool 50 due to the lesser axial stability of the sizer 100 relative to the tool 50. A piece of wood along which the hand drill 26 may be guided can increase the accuracy and stability of the direction of feed simply and inexpensively, if needed.

The preferred operation of the sizer involves taking the cross-sectional diameter of the dowel only the size of the next adjacent hole during each sizing step. Thus, if a ⅜ inch dowel is to be sized to 0.339 inches, the dowel will be successively presented through the holes having diameters of 0.368, 0.358, 0.348, and 0.339 inches.

Once the operation of sizing is completed, the operator can readily finely finish his dowel merely by inserting the point 16 into the sanding hole 106 and running the hand drill 26 in one hand while holding the dowel 10 in place with the operator's other hand holding sandpaper 108 against the dowel 10.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A dowel cutter apparatus comprising a rotatable chuck;

means for rotating said chuck;

means for holding a length of woodstock in said chuck to be rotatable with said chuck;

A cylindrical cutting tool having a cylindrical inner surface, a cylindrical outer surface, an inside diameter, an input end having at least one cutting edge disposed along said inside diameter, an output end spaced apart from said input end, and at least one planar face extending from said cutting edge on said inner surface to said outer surface, forming an angle with a line parallel to said axis, and intersecting said edge;

means for holding said tool in a stationary position;

wherein said woodstock is rotated by said chuck and inserted axially into said tool at said cutting edge to form a length of dowel.

2. An apparatus in accordance with claim 1, wherein said angle is within a range of plus 3 degrees to plus 80 degrees.

3. An apparatus in accordance with claim 2, wherein said angle is approximately plus 60 degrees.

4. An apparatus in accordance with claim 1, wherein said angle is within a range of minus 3 degrees to minus 80 degrees.

5. An apparatus in accordance with claim 4, wherein said angle is approximately minus 30 degrees.

6. An apparatus in accordance with claim 1, wherein said input end comprises a series of cutting edges and non-cutting edges and corresponding faces to said edges.

7. An apparatus in accordance with claim 6, wherein said faces are substantially uniform between said cutting edge faces and said non-cutting edge faces.

8. An apparatus in accordance with claim 6, wherein said cutting edge faces are substantially different from said non-cutting edge faces.

9. An apparatus in accordance with claim 1, wherein said cutting tool has an axial length between said input end and said output end greater than the inside diameter of said tool.

10. A sizer for accurately varying the diameter of a dowel comprising a plurality of cutting tools disposed on a flat plate;

means for holding said plate in a stationary position; and means for rotating said dowel;

wherein said dowel is directed axially into selected of said cutting tools to accurately cut a dowel to a desired diameter.

11. A sizer in accordance with claim 10, wherein said cutting tools have a range of sizes at 1/16 inch intervals.

12. A sizer in accordance with claim 10, wherein said cutting tools have a range of sizes at drill size intervals.

13. A claim in accordance with claim 10, wherein said sizing tool further comprising means for sanding said dowel surface including sandpaper, means for holding one end of said dowel in a driven rotatable position, and means for holding and rotatably driving said other end of said dowel, wherein said dowel surface is directed into contact with said sandpaper while said dowel is rotated by said driving means.

14. A sizing tool for accurately varying the outside diameter of a dowel comprising a metal plate having a series of various sized circular holes and being ground on one side of said plate, means for holding said plate in a stationary position, and means for rotating a wooden dowel about its longitudinal axis, wherein said rotating dowel is directed axially into one of said holes through said one side of said plate to size the dowel to a selected outside diameter.

* * * * *